United States Patent [19]

Curtis et al.

[11] Patent Number: 5,536,808
[45] Date of Patent: Jul. 16, 1996

[54] THIAZOLE POLYMERS AND METHOD OF PRODUCING SAME

[75] Inventors: M. David Curtis; John I. Nanos, both of Ann Arbor, Mich.; Mark D. McClain, Albuquerque, N.M.

[73] Assignee: The Regents of the University of Michigan, Ann Arbor, Mich.

[21] Appl. No.: 321,041

[22] Filed: Oct. 5, 1994

[51] Int. Cl.$^6$ ................................................. C08G 75/00
[52] U.S. Cl. ........................... 528/377; 528/390; 528/420
[58] Field of Search .................................... 528/377, 390, 528/420

[56] References Cited

U.S. PATENT DOCUMENTS

| | | | |
|---|---|---|---|
| 3,357,956 | 12/1967 | Frazer | 528/390 |
| 3,864,310 | 2/1975 | Saferstein | 528/180 |
| 4,569,734 | 2/1986 | Naarmann et al. | 204/78 |
| 4,622,285 | 11/1986 | Ahne | 430/322 |
| 4,640,749 | 2/1987 | Naarmann et al. | 204/59 R |
| 4,756,994 | 7/1988 | Araki et al. | 430/281 |
| 4,758,634 | 7/1988 | Jenekhe | 525/398 |
| 4,818,646 | 4/1989 | Takakubo et al. | 429/213 |
| 4,987,042 | 1/1991 | Jones et al. | 528/373 |
| 5,108,573 | 4/1992 | Rubinstein et al. | 204/290 R |

OTHER PUBLICATIONS von H. Lehr and H. Erlenmeyer, "Strukturchemische Untersuchungen X. Zur Kenntnis des reaktiven Verhaltens von Di–thio–amiden aliphatischer Dicarbonäuren", Helv. Chimica Acta, No. 27, 489–493, 1944.

P. Sybert, "Polybithiazoles", Encyclopedia Polymer Science & Engineering, vol. 11, 644–647, 1987.

M. Catellani, S. Destri, W. Porzio, B. Thémans, and J. L. Brédas, "Thiazole–Based Polymers: Synthesis, Characterization and Electronic Structure", Synthetic Metals, 26, 259–265, 1988.

G. Audisio, M. Catellani, S. Destri, B. Pelli, and P. Traldi, "Mass Spectrometric Synthesis. V. The Gas–phase Ion–molecule Dimerization of some Sulfur Containing Heterocycles", J. Heterocyclic Chem., 27, 463–467, Feb. 1990.

M. Kanatzidis, "Conductive Polymers", Chemical & Engineering News, 36–54, Dec. 3, 1990.

T. Yamamoto, S. Wakabayashi, and K. Osakada, "Mechanism of C–C coupling reactions of aromatic halides, promoted by Ni (COD)$_2$ in the presence of 202–bipyridine and PPH$_3$, to give biaryls", Journal of Organometallic Chemistry, 428, 223–237, 1992.

S. Etaiw, R. Farag, A. El–Atrash, and A. Ibrahim, "Spectrophotometric studies of some thiazole and benzothiazole derivatives", Spectrochimica Acta, vol. 48A, No. 7, 1025, 1992.

S. Etaiw, R. Farag, A. El–Atrash, and A. Ibrahim, "117:99953g Spectrophotometric studies of some thiazole and benzothiazole derivatives", 73–Spectroscopy, vol. 117, 669, 1992.

T Yamamoto, A. Morita, Y. Miyazaki, T. Maruyama, H. Wakayama, Z. Zhou, Y. Nakamura, T. Kanbara, S. Sasaki, and K. Kubota, "Preparation of π–Conjugated Poly(thiophene–2,5–diyl), Poly(p–phenylene), and Related Polymers Using Zerovalen Nickel Complexes, Linear Structure and Properties of the π–Conjugated Polymers", American Chemical Society, vol. 25, No. 4, 1214–1223, 1992.

T. Yamamoto, "Electrically Conducting and Thermally Stable π–Conjugated Poly(Arylene)s Prepared by Organometallic Processes", Prog. Polym. Sci., vol. 17, 1153–1205, 1992.

I. Jenkins and P. Pickup, "Electronically Conducting Polymers Containing Conjugated Bithiazole Moieties from Bis(thienyl)bithiazoles", Macromolecules, vol. 26, 4450–4456, 1993.

*Primary Examiner*—Mark D. Sweet
*Attorney, Agent, or Firm*—Barnes, Kisselle, Raisch, Choate, Whittemore & Hulbert

[57] ABSTRACT

The preferred polymers comprise cyclic units having sulphur at the 1 position, nitrogen at the 3 position, a substituent R group carried off of a carbon at the 4 position, and a carbon at each of the 2 and 5 positions of the thiazole ring. Each of the units is connected through the 2 or 5 position to another thiazole unit. Intermediate units are connected through the 2 and 5 positions to thiazole units on either side, terminal (end) units are connected to a respective adjacent thiazole unit at the 2 position, hydrogen or another substituent is carried off of the 5 position of the terminal unit. The R substituent group is a hydrocarbon having more than 1 carbon atom.

28 Claims, 16 Drawing Sheets

$R = CH_3(CH_2)_n, n = 8$ $R = CH_3(CH_2)_n \quad n = 5$

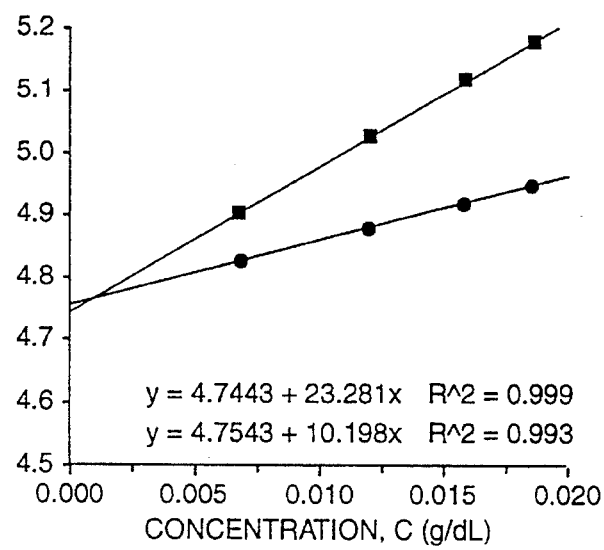
FIG. 21
$y = 4.7443 + 23.281x \quad R^2 = 0.999$
$y = 4.7543 + 10.198x \quad R^2 = 0.993$
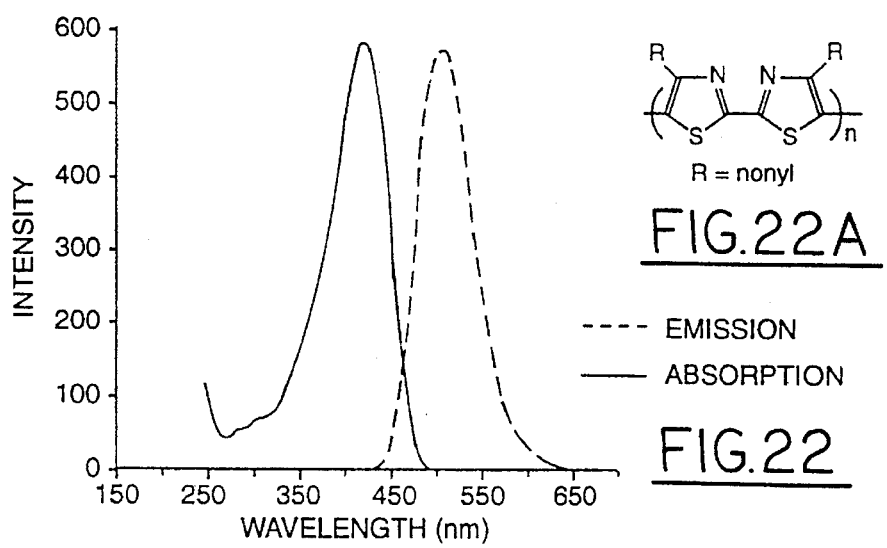
FIG. 22A
R = nonyl
FIG. 22
- - - - EMISSION
——— ABSORPTION
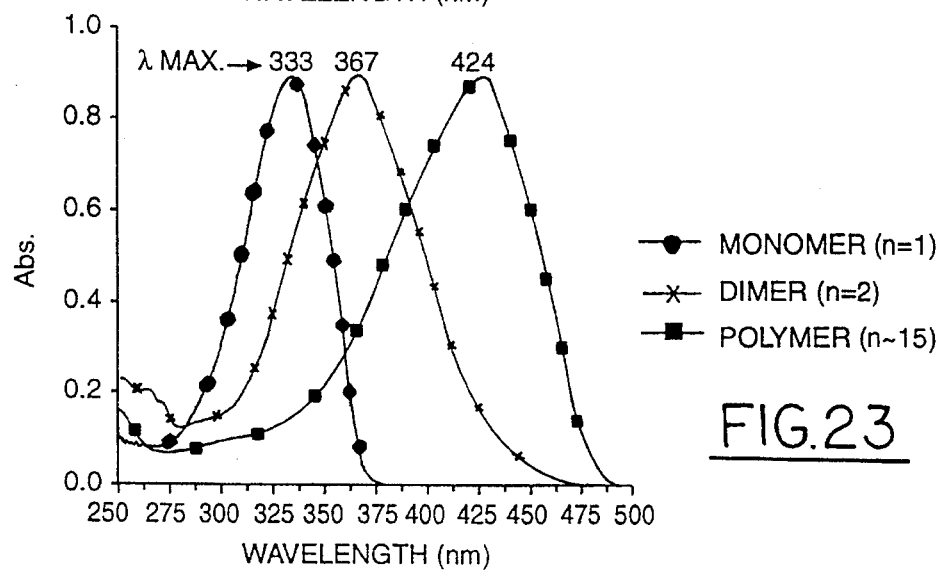
λ MAX. → 333  367  424
- ● — MONOMER (n=1)
- × — DIMER (n=2)
- ■ — POLYMER (n~15)
FIG. 23

1

THIAZOLE POLYMERS AND METHOD OF PRODUCING SAME

FIELD OF THE INVENTION

The present invention relates to polymers of thiazole and a method for preparing polymers of thiazole.

BACKGROUND OF THE INVENTION

In the past, a key property of most polymers which was thought to distinguish them from metals was the inability to carry electricity. During the past 15 to 20 years a new class of organic polymers has been developed with the surprising ability to conduct electrical current. The ability to conduct electrical current gives rise to possible applications, such as, rechargeable batteries, electrolytic capacitors, variable light transmittance windows, electrochromic display devices, and light emitting diodes (LED's). Conductive polymers are known to have one thing in common. They contain pi-conjugated systems, that is, single and double bonds alternating along a main polymer chain. Such highly conjugated polymers having regular alternating single and double bonds include, for example, polyacetylene, polythiophene, polypyrrole, polyaniline, and poly-p-phenylene. General background concerning structure, properties, and uses of redox active, electroactive, conductive polymers is described in an article entitled "Conductive Polymers" by Mercouri G. Kanatzidis published in *Chemical and Engineering News*, Dec. 3, 1990 and in U.S. Pat. Nos. 4,569,734; 4,640,749; 4,818,646; 4,987,042; 5,108,573; and 4,758,634 each of which is incorporated by reference in its entirety. One drawback to the use of such polymers in many applications is their lack of processability due to the insoluble and/or infusible nature of the polymers. For example, U.S. Pat. No. 5,108,573 demonstrates polyaniline grown electrochemically on a substrate. Similar electrochemical polymerization is described in U.S. Pat. No. 4,569,734; 4,640,749; 4,818,646; and 4,987,042. These methods of preparation, which rely on electrochemical polymerization, form films adhered to a substrate rather than free-standing films. Oxidative polymerization by electrochemical or chemical means is also known to introduce defects, e.g., chain branching, cross-linking, incorporation of chloride or other anionic groups, and over-oxidation. These defects limit the solubility and conductivity of the polymer films.

Accordingly, there is a need for a new class of polymers having the highly conjugated, regular alternating single and double bonds, and a new method for their preparation.

SUMMARY OF THE INVENTION

It is an object of the present invention to provide a new class of polymers based on thiazole, such polymers having highly conjugated, regular alternating single and double bonds. It is also an object of the present invention to provide a method for producing the new class of polymers based on thiazole.

Another object is to provide new oligomeric and polymeric thiazoles which are homopolymers. Still another object is to provide a method which permits their production without the defects introduced by electrochemical methods of production, and which is suitable for scale up to commercial processing.

In accordance with the invention, polymers comprise cyclic thiazole units of the formula as shown in FIG. 1. More particularly, a preferred polythiazole of the invention comprises the cyclic units of FIG. 1 directly linked one to another without any intervening chemical group between the cyclic units. As can be seen in FIGS. 1 and 2, the sulphur of the heterocyclic ring is at the 1 position, nitrogen is at the 3 position, and a R group is carried at the 4 position. A carbon is at each of the 2 and 5 positions. These heterocyclic units are able to form polymers with 2,5 links and are called poly-2,5-thiazoles with R at the 4 position. The R is any hydrocarbon compound. It is preferred that the R group is an aliphatic, an aromatic, a heteroaromatic, a cyclic, a heterocyclic, combinations and mixtures thereof. The R group may itself carry a substituent so that the R group is either substituted or unsubstituted. Accordingly, the R group is essentially any hydrocarbon but it is preferred that the R group not contain an acidic proton, e.g., a carboxylic acid, or an oxo group as embodied in ketones, esters, and the like, when certain methods of preparation are used. The R groups may be the same or different.

In one embodiment, a polymer comprises at least three of the cyclic thiazole units connected one to another by linkage between any combination of the carbons at the 2 and 5 positions. In another embodiment, a polymer comprises at least 2 cyclic thiazole units connected one to another by linkage between any combination of the carbons at the 2 and 5 positions; and where R is a hydrocarbon compound having more than 1 carbon atom. These polymers may be homopolymers or copolymers. It is preferred that the cyclic thiazole units form a homopolymer, with a pair of end cyclic thiazole units and intermediate cyclic thiazole units between the end units, where each of the intermediate units is connected through its 2 and 5 positions to respective adjacent intermediate thiazole units, and where each of the end units is connected through its 2 position to a respective adjacent intermediate thiazole unit and carries hydrogen or another terminal group at its 5 position.

As used herein, the prefix poly refers to a polymer and also to an oligomer containing relatively few structural units. It should be noted that different orientations, arrived at by rotation about a carbon-carbon single bond, are not considered to be different compounds. These concepts are well-known in the art. In the preferred embodiment, polythiazoles are formed from monomers containing 2 thiazole units as illustrated in FIG. 2 with direct connections between the 2 thiazole units at the 2,2' position. These are referred to as bithiazoles, and as 4,4'-diR-2,2'-bithiazole. In the most preferred embodiment, R is alkyl, aryl, heteroaryl, alkyl substituted aryl, or alkyl substituted heteroaryl. Two examples of such most preferred embodiments are 4,4'-diaryl-2,2'-bithiazole and 4,4'-diheteroaryl-2,2'-bithiazole. In a preferred method of the invention, -4,4'-diR-2,2' bithiazole units as shown in FIG. 2 are polymerized to provide a regio-regular pattern which contributes to optimization of certain desired properties, such as, electrical conductivity. Such preferred polymerization technique results in preparation of polymers having the monomeric units as shown in FIG. 2 with connections between such polymer monomeric units at the 5,5 position. Most preferred polymers are poly(5,5'-( 4,4'-diR-2,2'-bithiazole)) as exemplified in FIG. 3. FIG. 3 illustrates a dimer and a higher polymer in the regio-regular HHTTHHTT pattern where H designates head at ring position 2 and T designates tail at ring position 5. Other possible configurations are regio-regular HTHTHTHT (head, tail) and regio-random for the poly-2,5 thiazoles of FIGS. 1 and 2. The n designates number of repeat units.

The polythiazoles of the invention are prepared in a series of steps. In a preferred embodiment 4,4'-dialkyl- 2,2'-bithiazoles are prepared from a 1-halo-2-ketone, $RC(O)CH_2X$ (R equals alkyl, aryl, heteroaryl, or alkyl substituted aryl, or alkyl substituted heteroaryl; X equals Cl Br, I) and dithiooxamide. Then, such bithiazoles are brominated to replace a hydrogen carried at the 5 position with a bromine on each of the cyclic units. This produces 5,5'-dibromo-4, 4'-diR"-2,2'-bithiazole monomeric units (R=alkyl) which are then reacted in the presence of a catalyst, described more particularly below, to strip the bromine at the 5,5' positions and cause direct linkages between monomeric units at the 5,5' position. In the preferred method, a nickel catalyst is used but other transition metals may also be used. In addition, other synthesis methods may be suitable to form the polymers of the invention, including, but not limited to, methods which use heat, light, electrochemical, and various chemical means to initiate polymerization.

The polythiazoles of the invention were analyzed and found to have conductive properties, with a conductivity of at least about $3 \times 10^{-4}$ Siemens/cm. They also demonstrated thermochromism as evidenced by reversible color changes as a function of temperature.

The invention provides new polythiazoles produced in a simple process in solution. The polymers contain the highly conjugated regular alternating single and double bonds present in polymers demonstrated to be conductors of electricity. Furthermore, the nature of the R groups carried at the 4 position of the ring may be easily varied to provide various desirable properties, e.g., high thermal stability, solubility, processability, or fluorescence at different wavelengths. The invention advantageously provides a relatively straight-forward and low cost synthesis method which results in relatively high yield of such desirable polymers readily adaptable to scale up for commercial processing.

These and other objects, features, and advantages will become apparent from the following description of the preferred embodiments, claims, and accompanying drawings.

BRIEF DESCRIPTION OF THE DRAWINGS

FIG. 21 is a graph of viscosity of PNBT4, where the Y intercept value is about 4.75 dl/g which is the intrinsic viscosity (n) determined in chloroform at 30.0° C., of the poly(5,5'-(4,4'-dinonyl-2,2'-bithiazole)), also referred to as PNBT.

FIG. 22 is a graph of UV and florescence spectrum, showing absorption and emission spectra of the poly(5,5'-(4,4'-dinonyl-2,2'-bithiazole)), FIG. 22A, also referred to as PNBT.

FIG. 23 is a graph showing UV absorption spectra of the monomer of FIGS. 5 and 22A with R equal to nonyl; the dimer of FIG. 3A with n equal to 2 (4 cyclic units) and R equal to nonyl; and the poly(5,5'-(4,4'-dinonyl- 2,2'-bithiazole)), also referred to as PNBT, of FIG. 3B with n about equal to 15.

DETAILED DESCRIPTION OF THE PREFERRED EMBODIMENTS

Figure 1:
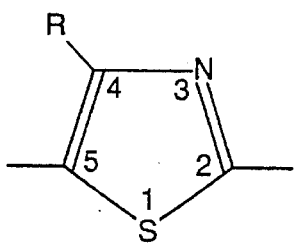
FIG. 1 is an illustration of a thiazole unit capable of forming a polymer of thiazole with links at the 2 (Head) and 5 (Tail) positions of the thiazole ring and an R group at the 4 position.
Figure 2:
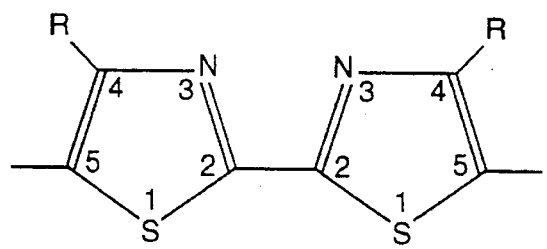
FIG. 2 is an illustration of a preferred thiazole monomeric unit capable of forming a poly-2,5 thiazole with the preferred 2—2 and 5—5 links between carbons of the thiazole rings.
Figure 3A:
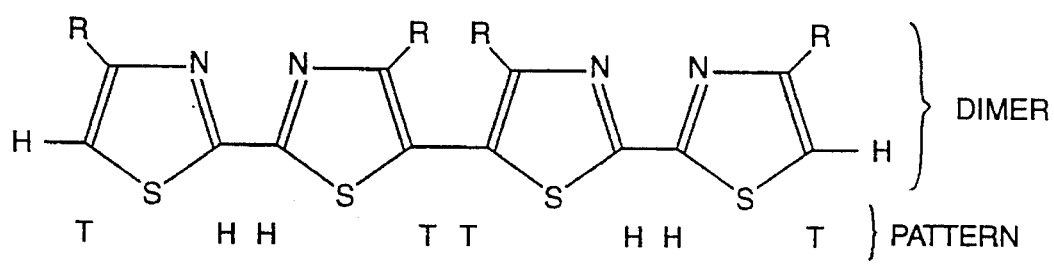
FIG. 3 illustrates a dimer (3A) and a higher polymer (3B) each formed from the monomeric units of FIG. 2 having the 2—2 and 5—5 links, resulting in the preferred regio-regular HHTTHHTT pattern.
Figure 3B:
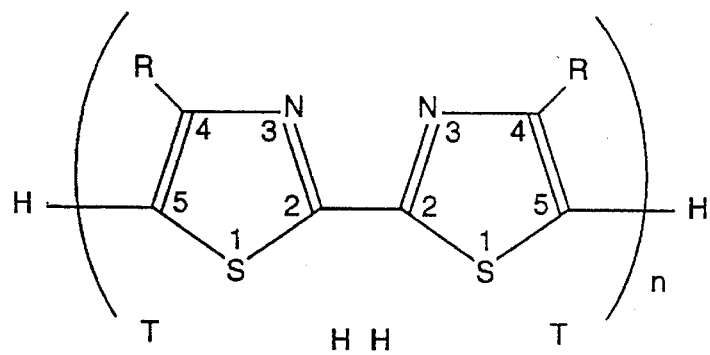

Polythiazoles comprising basic cyclic units shown in FIGS. 1 and 2 are prepared according to a new process. The preferred polythiazoles comprise cyclic units having sulphur at the 1 position, nitrogen at the 3 position, a substituent R group carried off of a carbon at the 4 position, and a carbon at each of the 2 and 5 positions of the thiazole ring. Each of the units is connected through the 2 or 5 position to another thiazole unit and R is selected from substituted or unsubstituted aliphatic compounds, substituted or unsubstituted aromatic compounds, substituted or unsubstituted heteroaromatic compounds, substituted or unsubstituted cyclic compounds, substituted or unsubstituted heterocyclic compounds, combinations thereof, and mixtures thereof. It is preferred that R not bear an acidic proton (e.g., —OH, —SH, —$CO_2$H) or a group readily attacked by a strong nucleophile (e.g., keto, ester, etc.) as these groups interfere with the polymerization reaction. It is preferred that R be an aryl, an alkyl substituted aryl, a heteroaryl, alkyl substituted heteroaryl, or alkyl. Functional groups that do not contain an acidic proton or groups that are readily attacked by nucleophiles are not only tolerated but are desirable in certain applications. Examples of such functional groups include, but are not restricted to, ether, tertiary amine, alkene, or alkyne groups. Desirably, R contains at least 1 carbon atom and preferably 2 or more carbons. Preferably R is an alkyl having 2 or more carbon atoms. The upper limit to the number of constituent elements in R is not thought to be critical as long as the R group does not interfere with the polymerization process. Some examples of R include alkyls, such as, ethyl, n-butyl, t-butyl, hexyl, and the like. Desirably, R is a nonyl, a thiophene, a heterocyclic compound, such as, pyridine, a phenyl, or a biphenyl.

A preferred process for preparing poly(5,5'-( 4,4'-dinonyl-2,2'-bithiazole)) will now be described with reference to Example 1 followed by an example of poly(5,5'(4,4'-dihexyl-2,2'-bithiazole)).

Example 1

Figure 4:
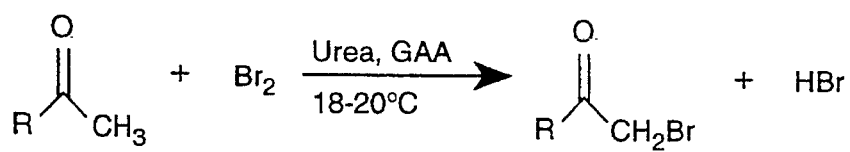
FIG. 4 is an illustration of the basic reaction for preparation of α brominated 2-ketones; with R equal to nonyl.

Example 1 - Part A

α-Bromination of 2-Ketones; procedure for R=nonyl (see FIG. 4):

In a 250 mL Schlenk flask was added 2-undecanone (51.8 mL, 0.251 mol), powdered urea (25.0 g, 0.417 mol), and glacial acetic acid (125 mL). Upon dissolution, an ice bath was applied and a solution of bromine (14.0 mL, 0.275 mol) in acetic acid 40 (mL) was added dropwise. The solution was kept between 18° C.–20° C. until the bromine color disappeared. The colorless solution was added slowly to ice/water (~300 mL). A white precipitate formed and was collected by filtration over a Buchner funnel. The product was analyzed via gas chromatograph. GC/Ms (crude) and was as follows: 69% desired product, 7% 3-bromo-2-undecanone, 19% dibromo species. The product was purified by recrystallization from methanol to give white crystals of a low melting solid. The yield was 60%.

Example 1 - Part B

Preparation of 4,4'-dialkyl-2,2'-bithiazoles; the alkyl is a nonyl (see FIG. 5):

In a 100 mL 3-neck flask equipped with a reflux condenser, nitrogen outlet, and septum, was placed 1-bromo-2-undecanone (15.03 mmol), dithiooxamide (7.52 mmol), and absolute EtOH (ethanol, 50 mL), and the mixture heated to reflux. After 10 minutes heating, the mixture dissolved to give a bright orange solution which darkened gradually to a deep burgundy color. After 4 hours reflux, the solution was cooled to room temperature without stirring and then was placed in the refrigerator overnight (15 hours). The resulting tan solid was collected via filtration, washed with cold MeOH (methanol), and dried invacuo 5 hours. This solid was pure enough for subsequent reactions but it was also further purified by recrystallization from methanol. The yield was 85%. M.P. (melting point) (59° C.–61° C.); $^1$H NMR ($CDCl_3$) (proton NMR in deutero chloroform) δ6.97 (s, 1H), 2.80 (t, 2H), 1.71 (q, 2H), 1.27 (m, 12H), 0.85 (t, 3H), $^{13}$CNMR (carbon 13 NMR) ($CDCl_3$) δ160.1, 158.7, 115.1, 31.8, 31.2, 29.5, 29.4, 29.25, 29.1, 22.6, 18.3, 14.0.

Example 1 - Part C

Dibromination of 4,4'-dialkyl-2,2'-bithiazoles (see FIG. 6):

In a 100 mL Schlenk flask was added 4,4'-dinonyl-2,2'-bithiazole (2.59 mmol), and dry chloroform (40 mL). From a dropping funnel was added a solution of bromine (6.48 mmol) in dry chloroform (5 mL). The brown-yellow solution was refluxed for 2 hours, cooled to room temperature, washed with 0.5M sulfuric acid (2×20 mL), 10% sodium bicarbonate (2×25 mL), and dried over sodium sulfate to give a yellow-tan solution. The solution was concentrated and crystallized in a freezer at −12° C. and the yield after 2 crops of crystals was 95% in the form of a light yellow fluffy solid. M.P. (68° C.–69° C.): $^1$HNMR ($CDCl_3$) δ2.74 (t, 2H), 1.70 (q, 2H), 1.27 (m, 12H), 0.88 (t, 3H). $^{13}$CNMR ($CDCl_3$) δ 159.8, 157.3, 106.8, 31.9, 29.56 - 28.70 (5 unresolved peaks), 28.7, 22.7, 14.2.

Example 1 - Part D

Figure 7:
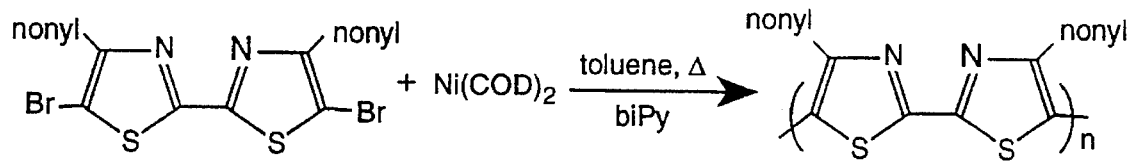
FIG. 7 illustrates polymerization of 5,5'-dibromo-4,4'-dinonyl-2,2'-bithiazole, also referred to as NBT-Br2,to form poly(5,5'-(4,4'-dinonyl-2,2'-bithiazole)), also referred to as PNBT.

Polymerization of (5,5'-dibromo-4,4'-dinonyl-2,2'-bithiazole) (NBT-Br2) using Ni(COD)$_2$ in Toluene (see FIG. 7):

In an inert atmosphere glove box, a 100 mL Schlenk flask was loaded with Ni(COD)$_2$ (0.856 g, 3.02 mmol). NOTE: COD=cyclooctadiene. The flask was removed from the box and in the hood, dry degassed toluene (65 mL) was added. Upon dissolution, sublimed 2,2-bipyridine (3.11 mmol) was added to the yellow solution causing an immediate color change to purple-indicative of the active Ni(COD)(biPy) complex. The monomer (5,5'-dibromo-4,4'-dinonyl- 2,2'-bithiazole) (2.52 mmol) was added and within 2 minutes, the color lightened to a burgundy. The solution was heated to reflux under $N_2$ gas causing a green murky mixture to form. Fluorescence with a UV lamp caused a bright lime green emission characteristic of coupled species. Reflux continued overnight a total of 16 hours, and the thick green mixture was cooled to room temperature. Slow precipitation into well stirred methanol (250 mL) yielded a fibrous red/green polymer. The solid was filtered over a glass frit, washed with methanol (50 mL), and water (75 mL). The polymer was a spongy, dark green, stringy solid. This solid was stirred with a warm solution of 10% EDTA (ethylene diamine tetra acetic acid) (aq) pH 9 for 10 minutes, filtered, washed with water, and finally with methanol. The air-dried polymer was added to hot chloroform (65 mL) to dissolve, and the dark red solution was precipitated into methanol (250 mL). Again, this dark red solid was filtered, washed with water and methanol, and dried at 60° C. invacuo overnight. The yield was 1.002 g (95%). The monomer 5,5'-dibromo-4,4'-dinonyl-2,2'-bithiazole is also referred to as NBT-Br2. The polymer, poly(5,5'-(4,4'-dinonyl- 2,2'-bithiazole)) is also referred to as PNBT. The physical features of the polymer, PNBT, will be described below, following Example 2.

Example 2

Figure 8:
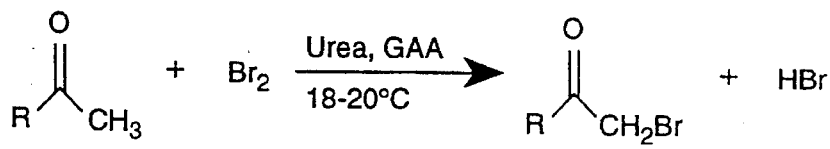
FIG. 8 illustrates the basic reaction for preparation of α brominated 2-ketones; with R equal to hexyl.

Example 2 - Part A

α-Bromination of 2-Ketones; procedure for R=hexyl (see FIG. 8):

In a 250 mL Schlenk flask was added 2-octanone (40 mL, 0.251 mol), powdered urea (25.0 g, 0.417 mol), and acetic acid (125 mL). Upon dissolution, an ice bath was applied and a solution of bromine (14.0 mL, 0.275 mol) in acetic acid (40 mL) was added dropwise. The solution was kept between 18° C.–20° C. until the bromine color disappeared. The colorless solution was diluted with water (250 mL) and extracted with $CH_2Cl_2$ (3×50 mL). The combined extracts were washed with 10% sodium carbonate, brine, dried over sodium sulfate, and evaporated to give a colorless liquid. GC/MS (crude) 59% desired product; 12% 3-bromo-2-octanone; 24% dibromo products. The products could be separated via fractional vacuum distillation with the clear colorless 1-bromo-2-octanone obtained at 65° C.–68° C. (1 mm Hg). $^1$H NMR ($CDCl_3$) δ0.88 (t, 3H), 128 (m, 6H), 1.61 (q, 2H), 2.64 (t, 2H), 3.88 (s, 2H) ppm.

Figure 5:
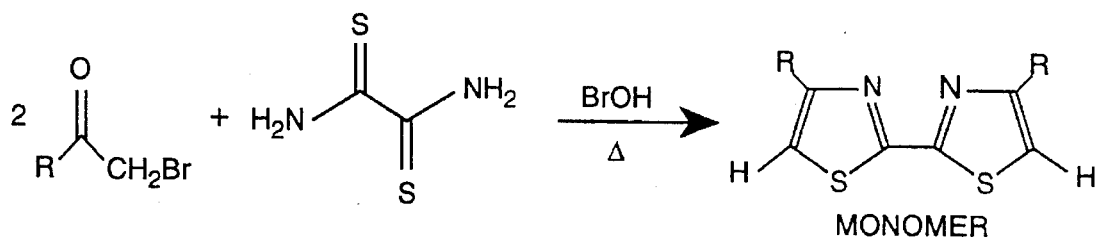
FIG. 5 is an illustration of the basic reaction for preparation of 4,4'-diR-2,2'-bithiazoles, according to Example 1 for R equals nonyl and Example 2 for R equals hexyl.

Example 2 - Part B 4,4'-dialkyl-2,2'-bithiazoles; the R is a hexyl (reaction as illustrated in FIG. 5 except that R is hexyl rather than nonyl):

In a 100 mL 3-neck flask equipped with a reflux condenser, nitrogen outlet, and septum, was placed 1-bromo-2-octanone (15.03 mmol), dithiooxamide (7.52 mmol), and absolute EtOH (40 mL), and the mixture heated to reflux. After 10 minutes heating, the mixture dissolved to give a bright orange solution which darkened gradually to a deep burgundy color. After 4 hours, the solution was cooled and slowly poured onto crushed ice (200 g). The resulting red-brown solid was quickly collected by filtration. The damp solid was dissolved in a minimum of warm hexane (35 mL), and decolorizing carbon, and sodium sulfate were added. The mixture was stirred with warming for 5 minutes and filtered over Celite to give a light burgundy solution. Two crops of tan granular crystals were collected in an 87% yield. M.P. (43.5° C.–45° C.); IR (KBr) - 2956, 2926, 2856, 1506, 1092, 981, 880; $^1$H NMR ($CDCl_3$) δ6.92 (s, 1H), 2.79 (t, 2H), 1.72 (q, 2H), 1.31 (m, 6H), 0.87 (t, 3H); $^{13}$CNMR ($CDCl_3$) 160.8, 159.1, 114.5, 31.6, 41.5, 29.1, 28.8, 22.5, 14.0; mass spectrum: $M^+$-$C_5H_{10}$ (266) Base peak.

Example 2 - Part C

Figure 6:
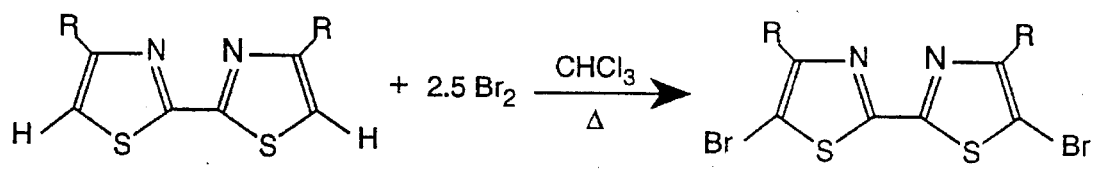
FIG. 6 illustrates dibromination of 4,4'-2,2'-bithiazoles, according to Example 1 for R equals nonyl and Example 2 for R equals hexyl.

Dibromination of 4,4'-dialkyl-2,2'-bithiazoles (reaction as illustrated in FIG. 6 except that R is hexyl rather than nonyl):

In a 100 mL Schlenk flask was added 4,4'-dihexyl-2,2'-bithiazole (2.59 mmol), and dry chloroform (40 mL). From a dropping funnel was added a solution of bromine (6.48 mmol) in dry chloroform (3 mL). The brown-yellow solution was refluxed for 2 hours, cooled to room temperature, washed with 0.5M sulfuric acid (2×20 mL), 10% sodium bicarbonate (2×25 mL), water (2×25 mL), and dried over sodium sulfate to give a yellow-tan solution. The solution was concentrated and crystallization in a freezer yielded after 2 crops, a light yellow fluffy solid in a 93% yield. M.P. (104° C.–105° C.); IR (KBr) 2956, 2928, 2857, 1504, 1023; $^1$H NMR ($CDCl_{13}$) δ2.74 (t, 2H), 1.70 (q, 2H), 1.33 (m, 6H), 0.89 (t, 3H); $^{13}$CNMR δ159.9, 157.4, 28.8, 8.6, 22.6, 14.0 ppm.

Example 2 - Part D

Figure 9:
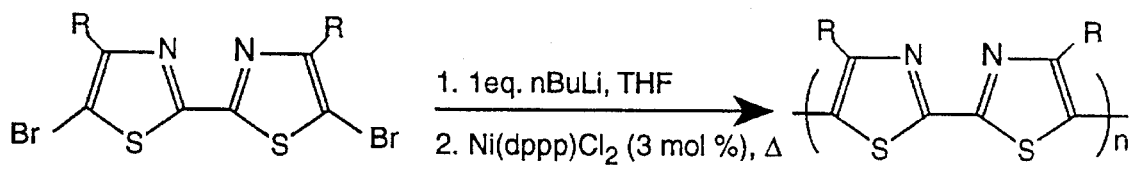
FIG. 9 illustrates polymerization of 5,5'-dibromo- 4,4'-dihexyl-2,2'bithiazole to form poly(5,5'-( 4,4'-dihexyl-2,2'-bithiazole)).

Polymerization of 4,4'-dialkyl-2,2'-bithiazole (see FIG. 9):

In a 100 mL Schlenk flask charged with doubly recrystallized 5,5'-dibromo-4,4'-dihexyl-2,2'-bithiazole (2.34 mmol) was added THF (tetrahydrofuran) (35 mL). The light-yellow solution was cooled to −78° C. and nBuLi (n-butyllithium) (2.34 mmol, 2.5M in hexanes) was added dropwise causing a darkening to a yellow-brown color. The solution was stirred for 45 minutes at −78° C. at which point the catalysts, Ni(dppp)$Cl_2$ (38 mg, 3 mol %) was added (dppp= diphenylphosphinopropane). Warming slowly to 25° C. gave a red-brown solution which was stirred for an additional 2 hours and then refluxed overnight (12 hours). The solution was cooled to room temperature and the polymer precipitated into vigorously stirred MeOH (250 mL) to give a rust red solid upon filtration. The polymer was reprecipitated from a minimum of hot THF (20 mL) into MeOH (200 mL), collected by filtration, and dried invacuo at 70° C. to give a 65% yield.

Monomer and Polymer Characteristics

Figures 24, 24A:
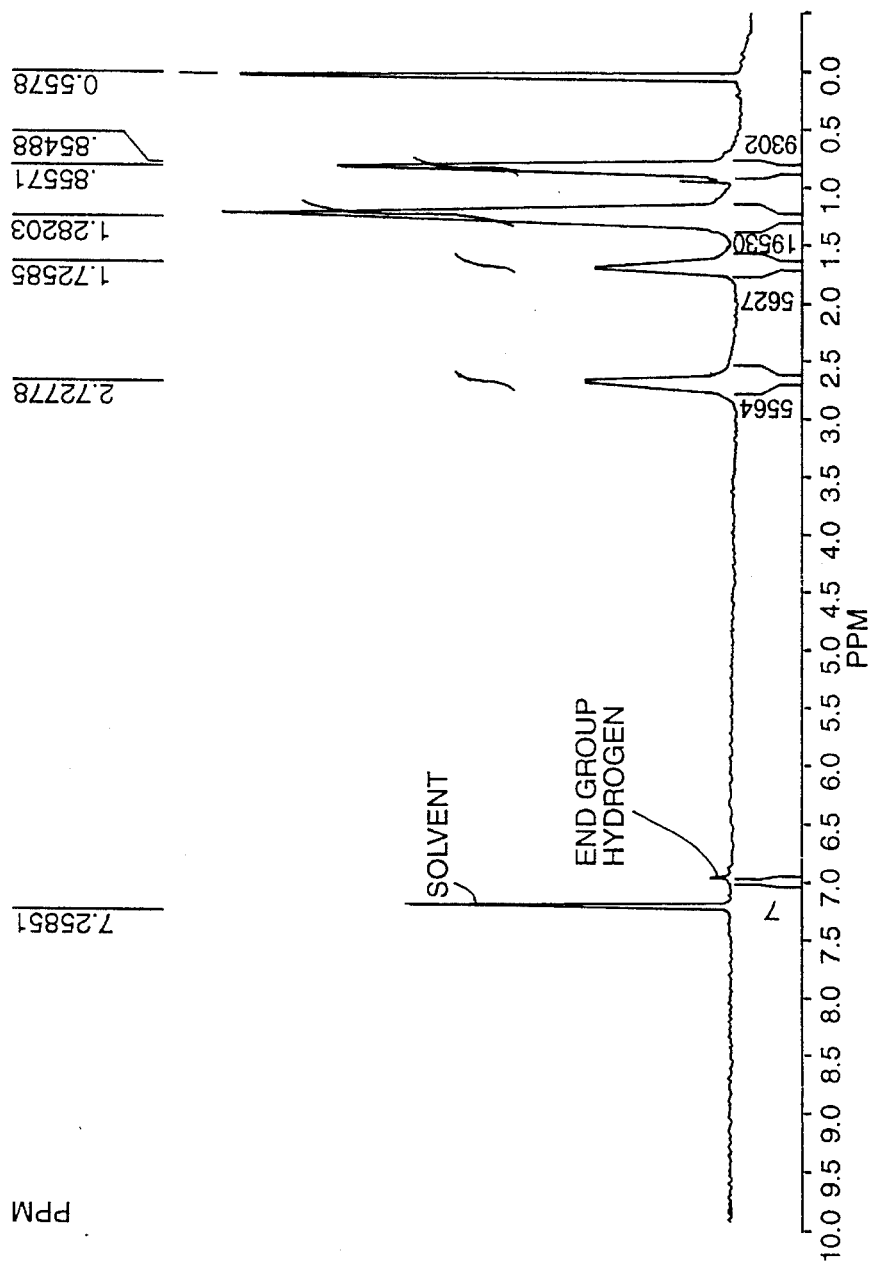
FIG. 24 is an $^1$H NMR of the poly(5,5'-(4,4'-dihexyl-2,2'-bithiazole)), as per FIG. 24A.
Figure 25:
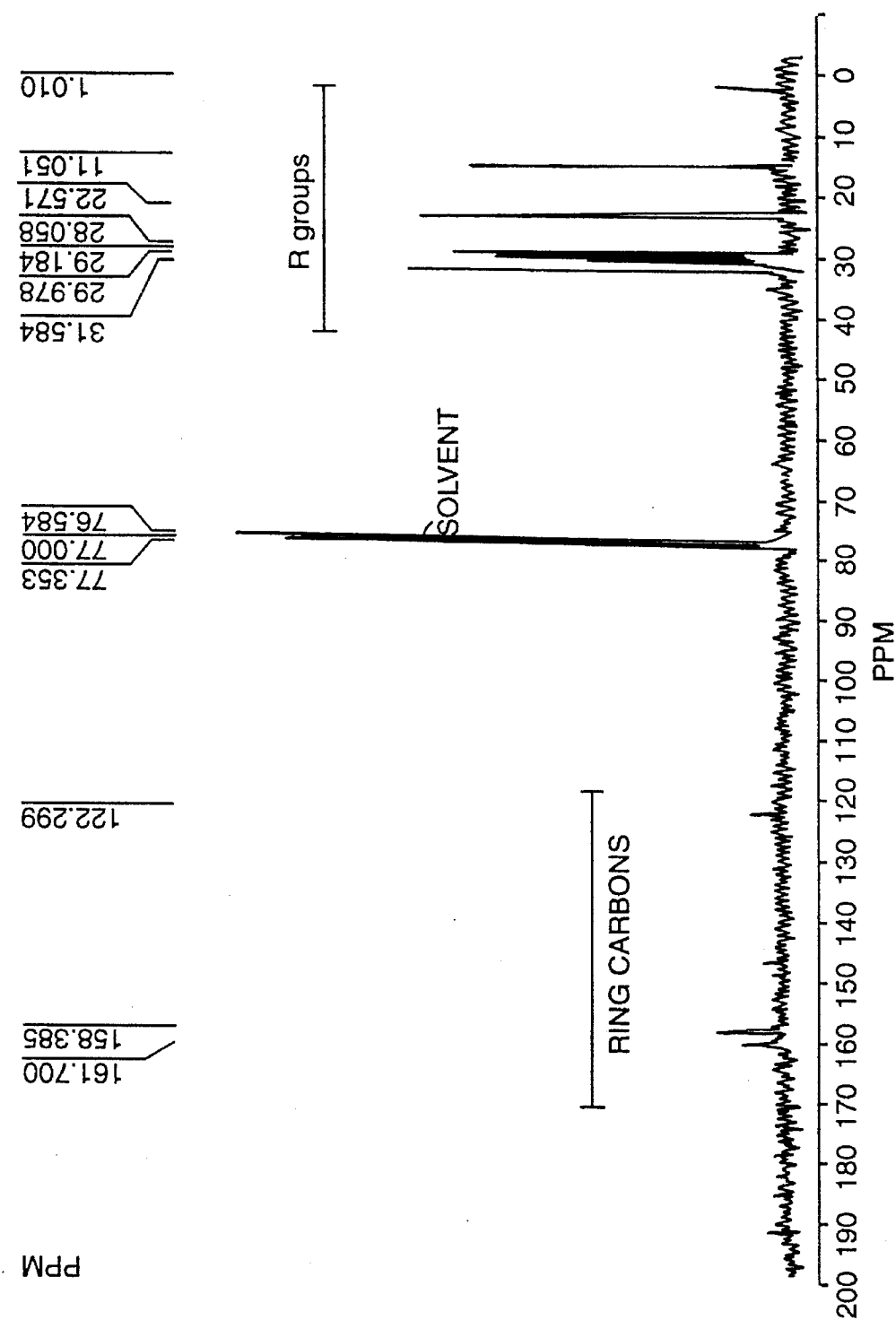
FIG. 25 is a carbon 13 ($^{13}$C NMR) of the poly(5,5'-(4,4'-dihexyl-2,2'-bithiazole)).

FIGS. 10 through 23 all pertain to the poly(5- 5'-(4,4'-dinonyl-2,2'-bithiazole)), also referred to as PNBT and precursors of such PNBT, all prepared in accordance with Example 1. FIGS. 24 and 25 pertain to the poly(5-5'-(4,4'-dihexyl-2,2'-bithiazole)), having about 8 or 9 repeat monomeric units, prepared according to Example 2.

FIGS. 10 through 13 show proton NMR spectra ($^1$H NMR) of the monomer, brominated monomer, dimer, and polymer having the R group being nonyl.

FIGS. 14 through 17 show carbon 13 NMR spectra ($^{13}$C NMR) of the monomer, brominated monomer, dimer, and polymer having R being nonyl.

Figure 18:
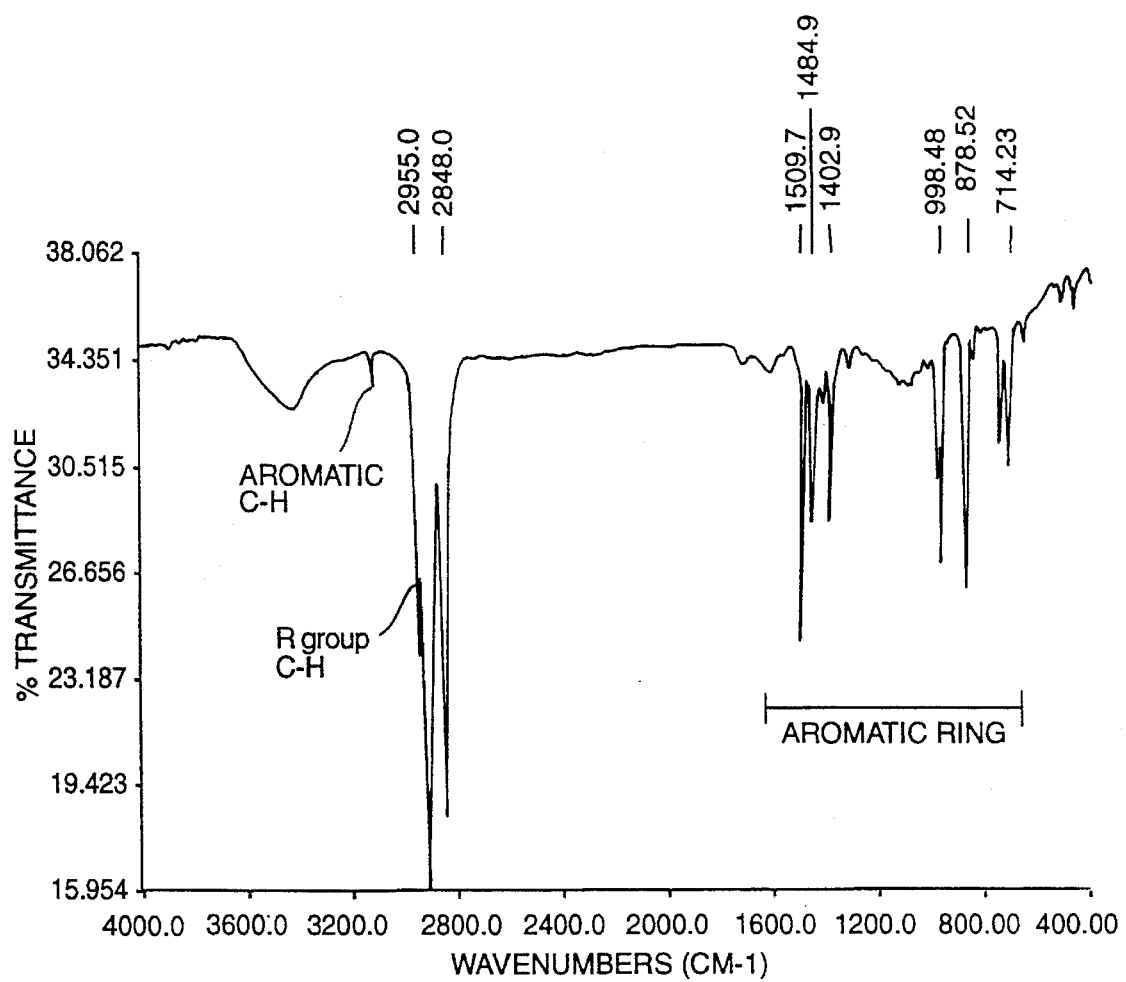
FIG. 18 is a KBr (Potassium Bromide) IR spectra of the bithiazole monomer having R equal to nonyl, as per FIG. 5.
Figure 19:
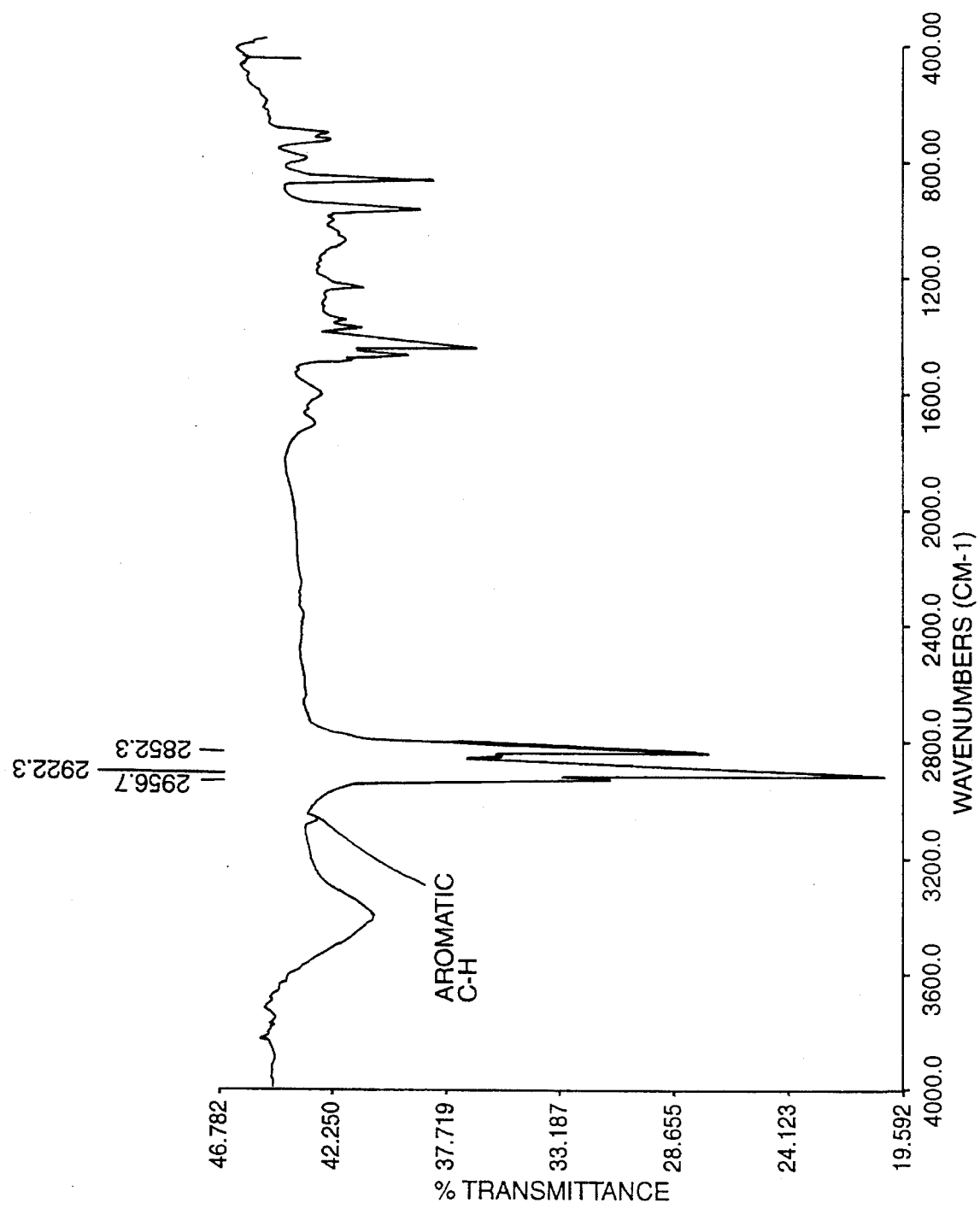
FIG. 19 is a KBr (Potassium Bromide) IR spectra of a dimer of the polybithiazole of FIG. 7 with n equal to 2 and R equal to nonyl. The dimer contains 4 cyclic units as per FIG. 3A.
Figure 20:
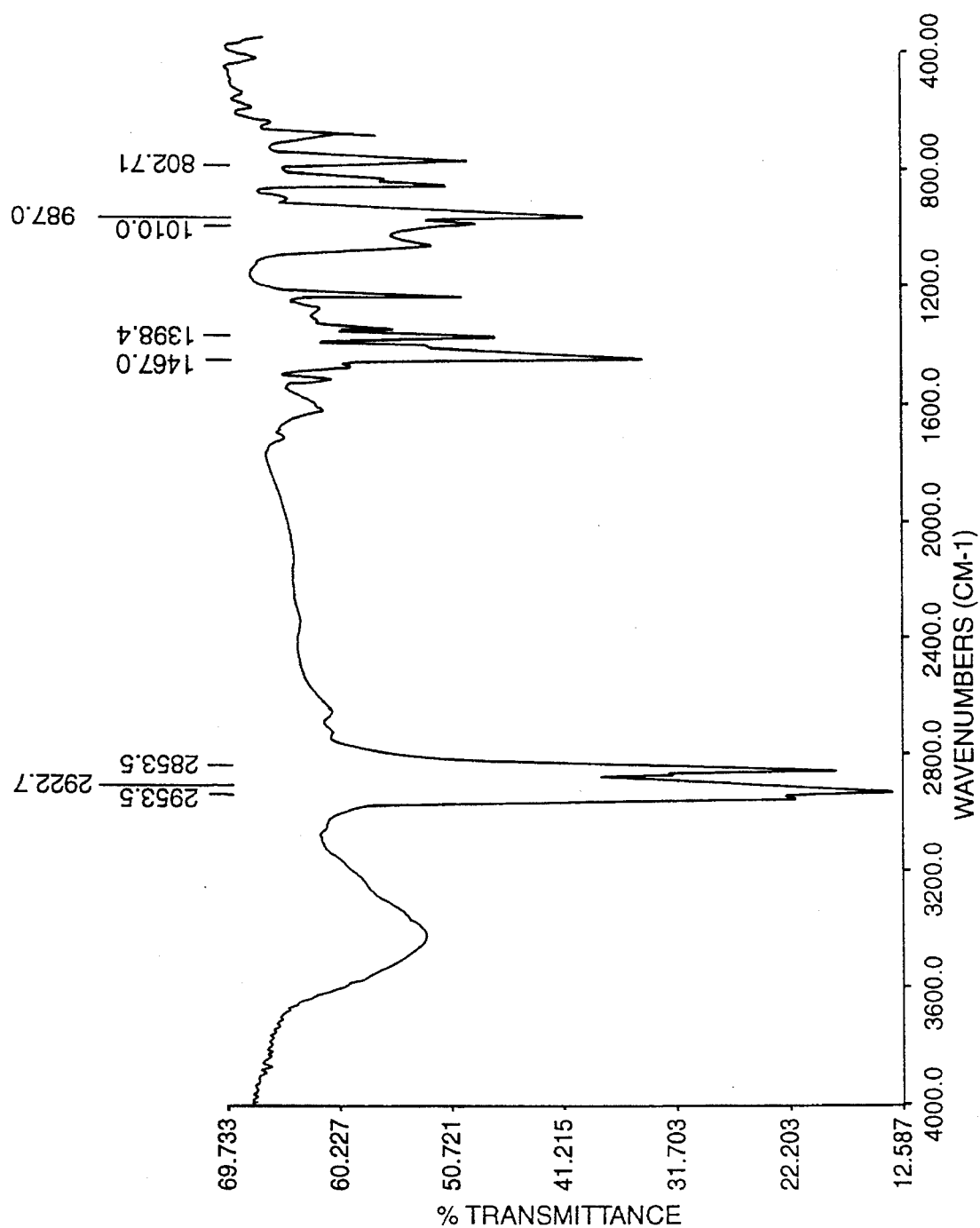
FIG. 20 is a KBr (Potassium Bromide) IR spectra of the poly(5,5'-(4,4'-dinonyl-2,2'-bithiazole)), also referred to as PNBT, of FIG. 7 with n greater than 20 and n about equal to 25. This higher polymer is as per FIG. 3B.

FIGS. 18 through 20 are KBr IR spectra of the monomer, dimer, and polymer having R being nonyl.

Figure 10A:
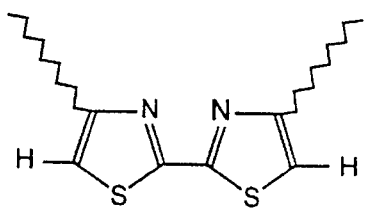
FIG. 10 is a proton NMR ($^1$H NMR) of the bithiazole monomer having R equal to nonyl, 4,4'dinonyl- 2,2'-bithiazole (NBT) monomer, FIG. 10A, as per FIG. 5; p237a, recrystallized from EtOH, pure NBT in CDCl$_3$.
Figure 10:
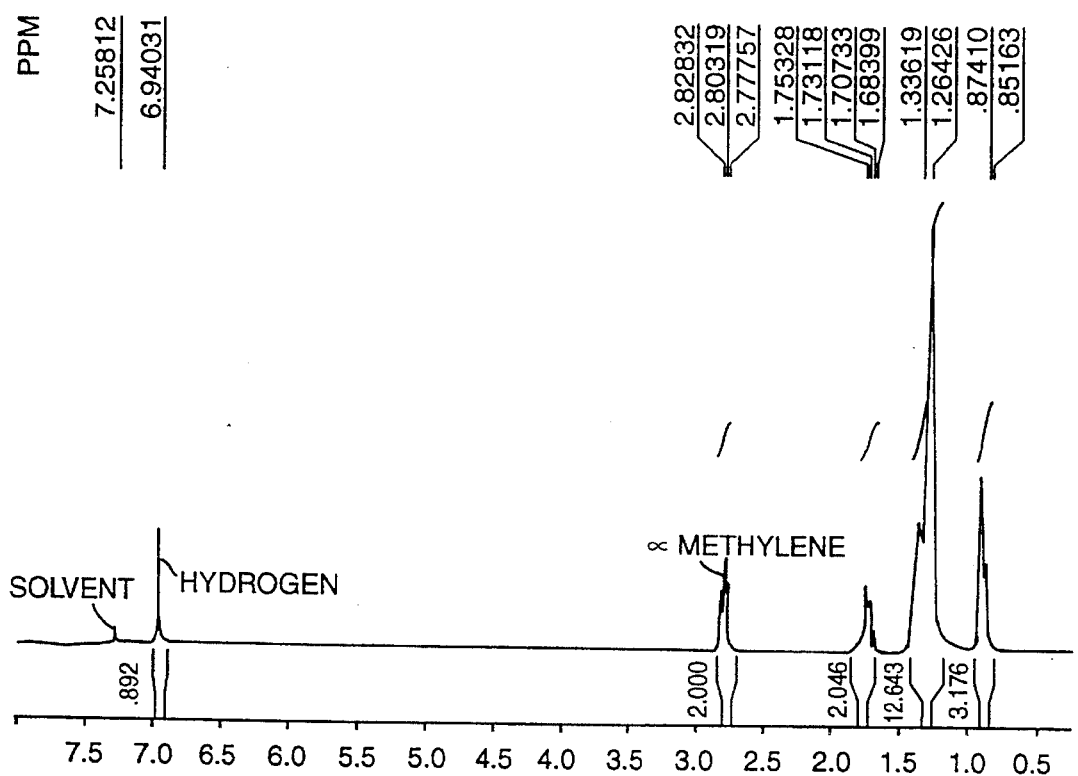

Beginning with FIG. 10, one can see that the proton NMR of the bithiazole carrying the nonyl R substituent showed a peak just below 7 ppm indicative of a hydrogen on the thiazole rings. Another peak at between 2.5 and 3 ppm showed the hydrogen at the alpha methylene position of the 2 nonyl groups being under approximately the same environment or influence.

Figure 11A:
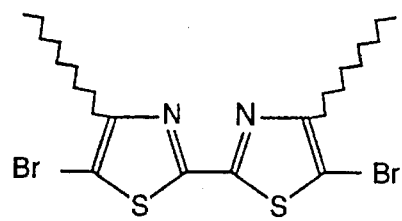
FIG. 11 is an $^1$H NMR, in CDCl$_3$, of a brominated bithiazole (NBT-Br$_2$) monomer having R equal to nonyl, FIG. 11A, as per FIG. 6.
Figure 11:
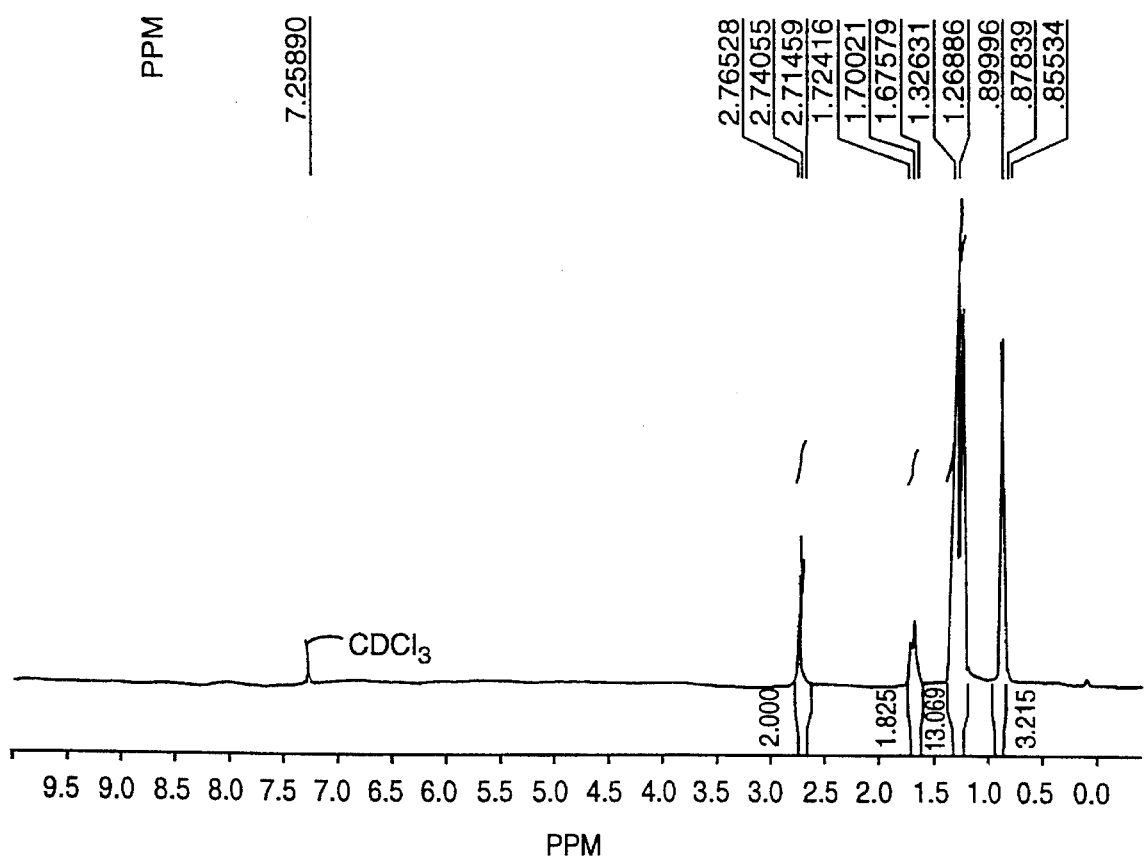

FIG. 11 showed the brominated bithiazole monomer with substituent nonyl did not have a hydrogen peak near the 7 ppm position. The hydrogen had been replaced by bromine indicating that this was the polymeric precursor.

Figure 12A:
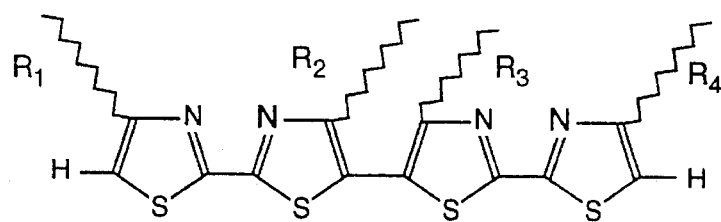
FIG. 12 is an $^1$H NMR of a dimer of the polybithiazole of FIG. 7 with n equal to 2 and R equal to nonyl, nonyl bithiazole dimer (NBT-dimer), FIG. 12A. The dimer contains 4 cyclic units as shown in FIG. 3A.
Figure 12:
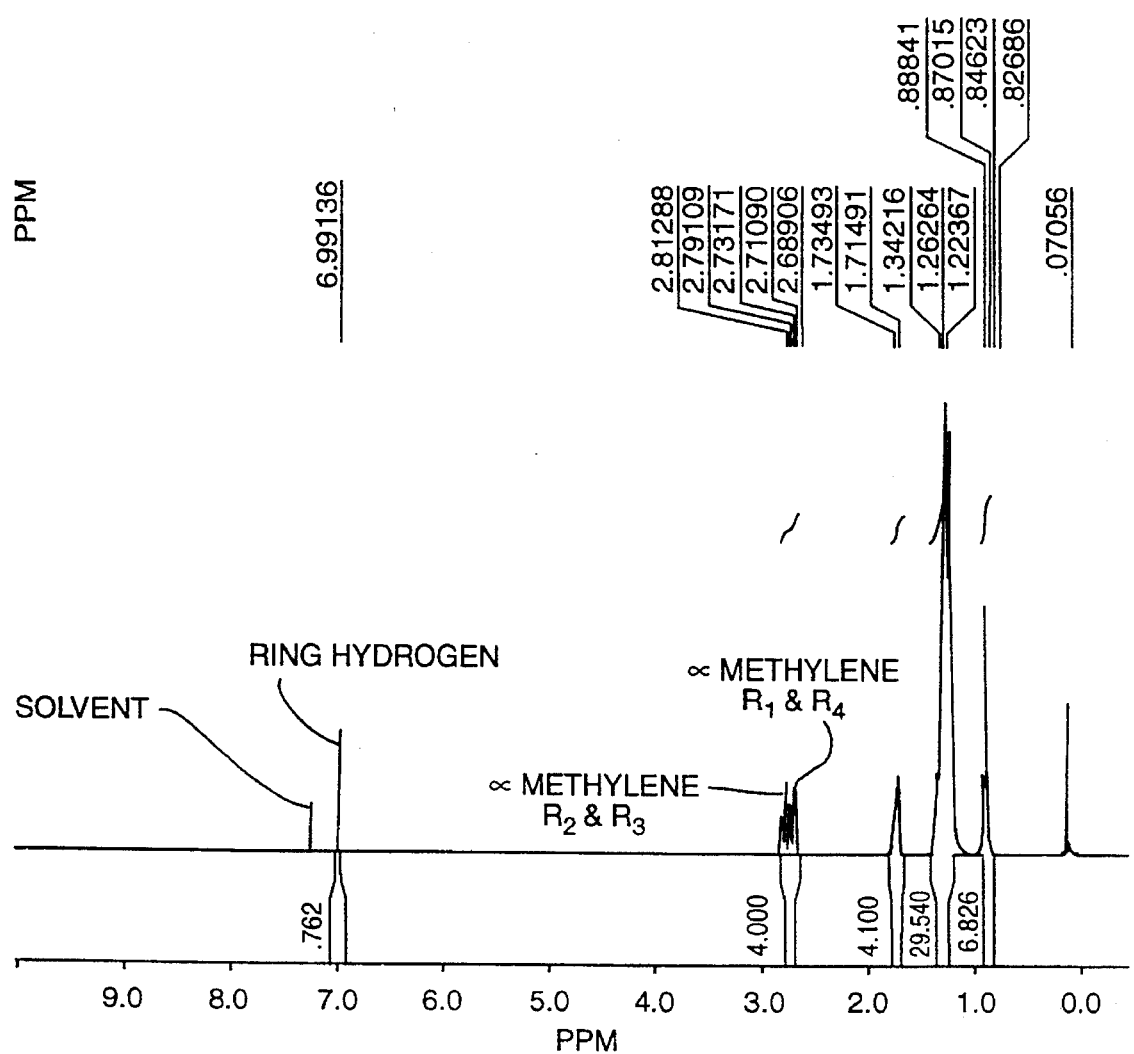

FIG. 12 is the proton NMR of a dimer of a polythiazole which contains 4 cyclic units with the R group being nonyl. The peak at the 7 ppm position showed the presence of ring hydrogen. The peak at between 2.5 and 3 ppm is now split into a pair of triplets indicating the magnetic inequivalence of the two sets of alpha methylene hydrogens (the outer set, adjacent to the ring hydrogen, and the inner set, adjacent to another thiazole ring.) This shows that the alpha methyl environments of the R groups differ indicating the presence of 4 cyclic units with mirror image identity.

Figure 13A:
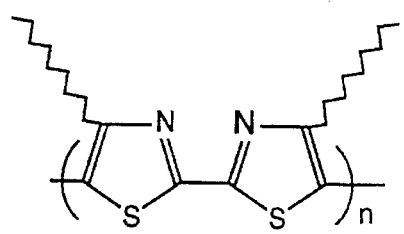
FIG. 13 is an $^1$H NMR, in CDCl$_3$, of the poly(5,5'-( 4,4'-dinonyl-2,2'-bithiazole)), also referred to as PNBT, of FIG. 7 with and n about equal to or greater than 15. This higher polymer is as per FIGS. 3B and 13A.
Figure 13:
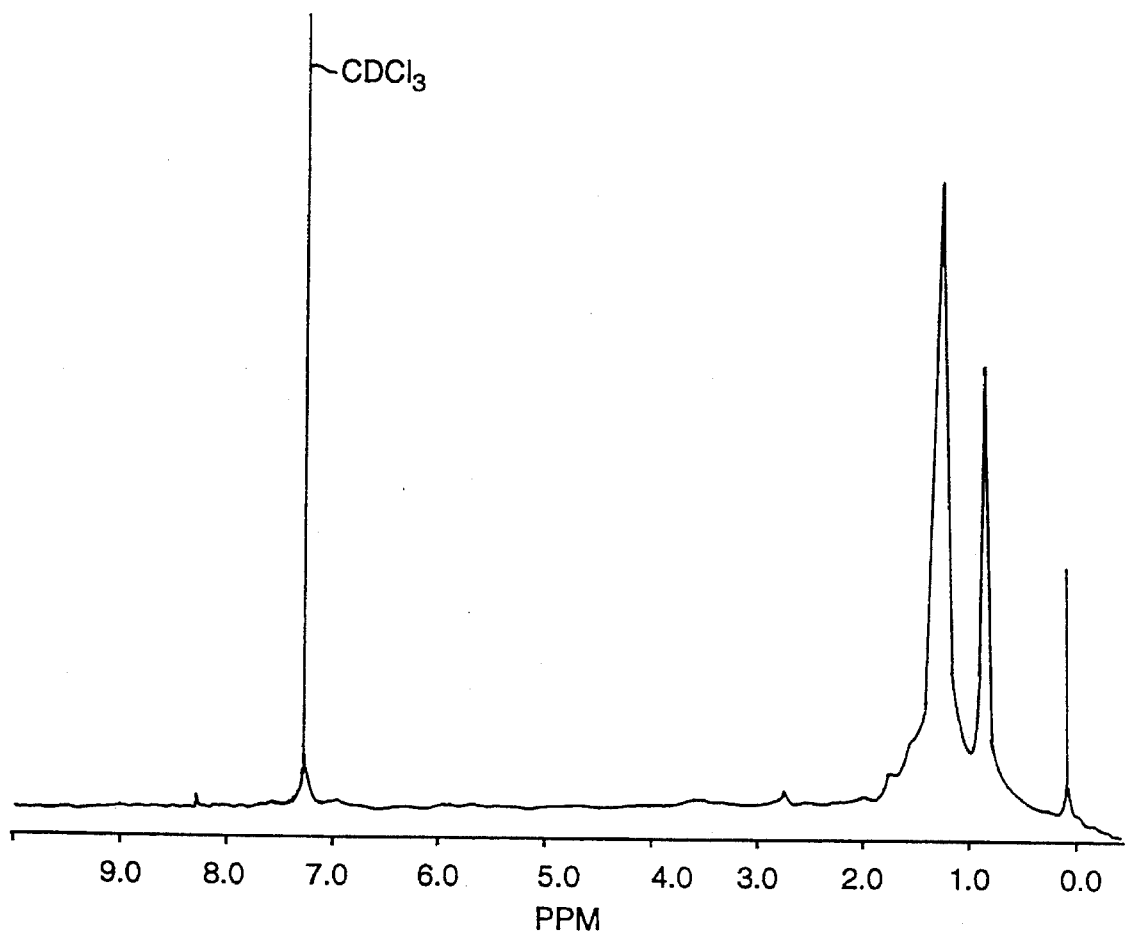

FIG. 13 is a proton NMR of the poly(5-5'-(4,4'-dinonyl-2,2'-bithiazole)) also referred to as PNBT with more than 20 monomeric units, and with n equal to about 25. FIG. 13 does not contain a signal corresponding to a hydrogen on the ring at the 7 ppm position. A multitude of chemical environments is indicated due to differing molecular weights of polymers which gives rise to different magnetic environments likely resulting from the coupling of one ring to another.

Figure 14A:
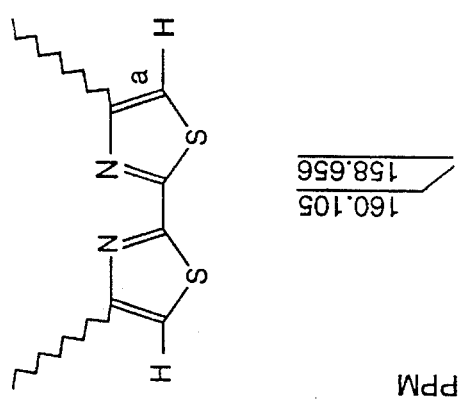
FIG. 14A shows the carbon carrying hydrogen (a).
Figure 14:
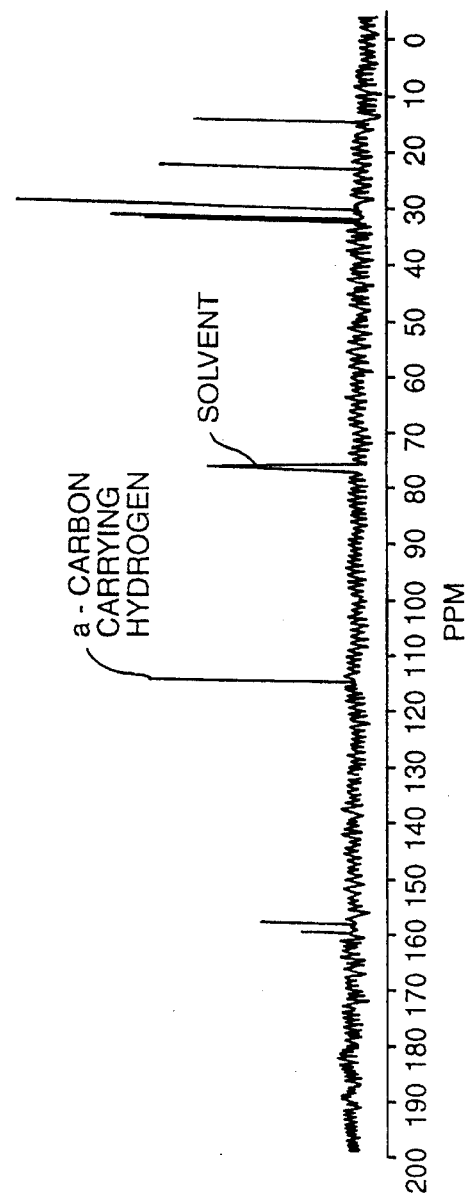
FIG. 14 is a carbon 13 ($^{13}$C NMR in CDCl$_3$) of the bithiazole monomer (NBT) having R equal to nonyl, as per FIG. 5.

FIG. 14 shows a carbon 13 NMR of the bithiazole monomer with the 3 ring carbon resonances at approximately 115 ppm and 160 ppm and 158 ppm. The signal at approximately 115 ppm is thought to be due to the carbon atom at the 5 position bearing the hydrogen.

Figure 15:
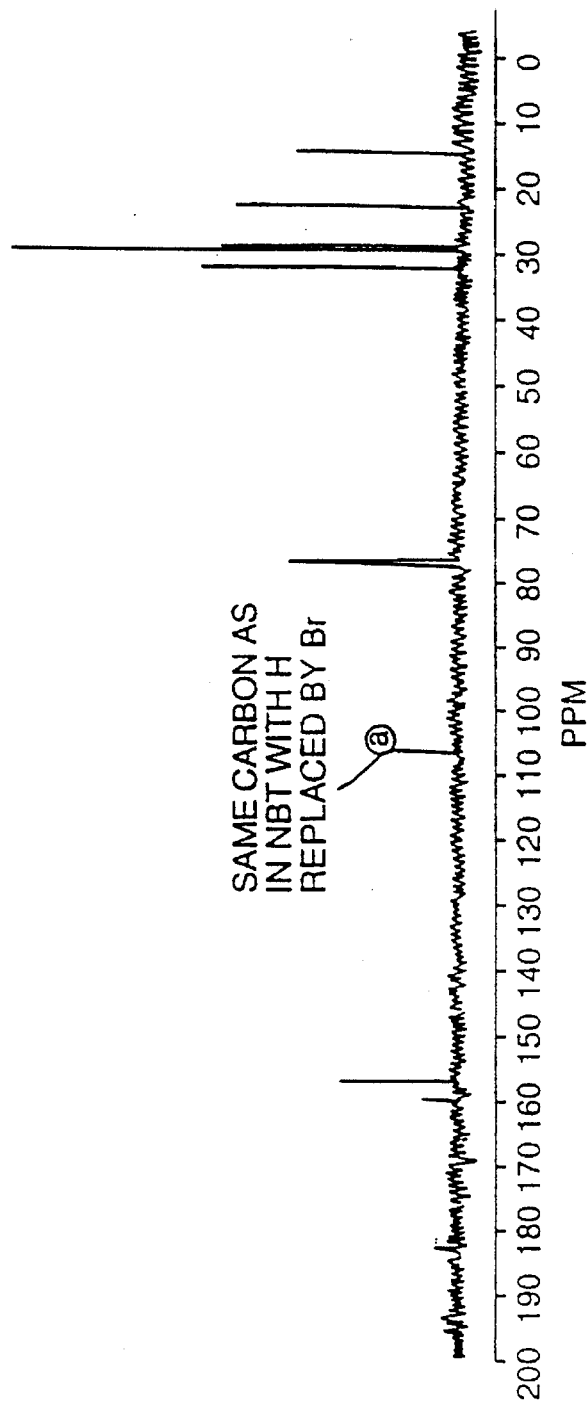
FIG. 15 is a carbon 13 ($^{13}$C NMR) of a brominated bithiazole monomer (NBT-Br$_2$) having R equal to nonyl, as per FIG. 6.

FIG. 15 is a carbon 13 NMR for the brominated bithiazole monomeric unit carrying bromine at the 5 position and the signal at 105 ppm is thought to evidence the same carbon which previously carried hydrogen now carrying bromine at the 5 position.

Figure 16:
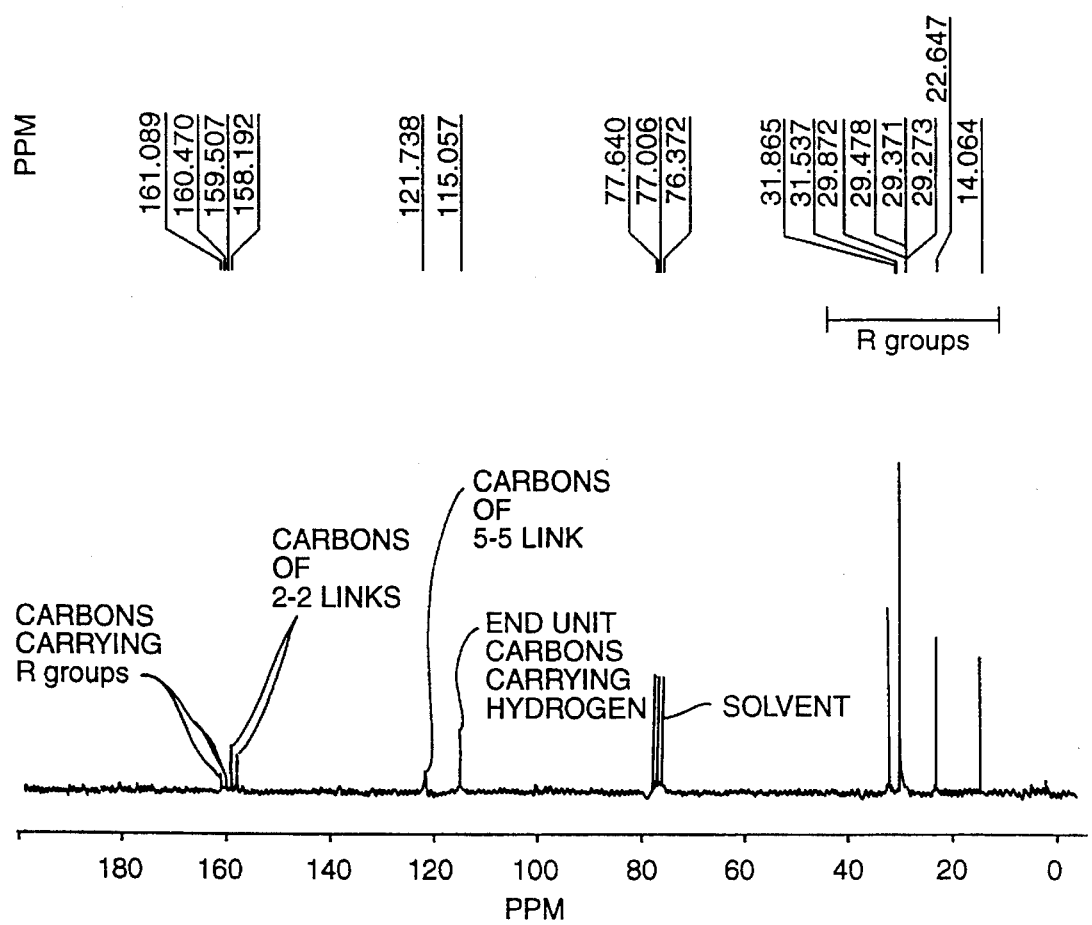
FIG. 16 is a carbon 13 ($^{13}$C NMR) in CDCl$^3$ of a dimer of the polybithiazole (NBT-dimer) of FIG. 7 with n equal to 2 and R equal to nonyl. The dimer contains 4 cyclic units as shown in FIG. 3A.

FIG. 16 is a carbon 13 NMR of the dimer containing 4 cyclic thiazole units. There are now a total of 6 ring carbon peaks showing the presence of two sets of magnetically inequivalent rings (the inner and outer as in the $^1$HNMR FIG. 12). Near 160 ppm it is thought that the 2 smaller peaks indicate carbons carrying the R substituent. The next pair of peaks are due to the carbons of the ring at the 2—2 link. The peak to the left of 120 ppm indicates the middle carbon at the 5 link. The peak at between 100 ppm and 120 ppm is thought to indicate the end group carbon at the 5 position carrying hydrogen. Signals in the region of between 0 ppm and 40 ppm indicate the carbons carried along the R group chain.

Figure 17:
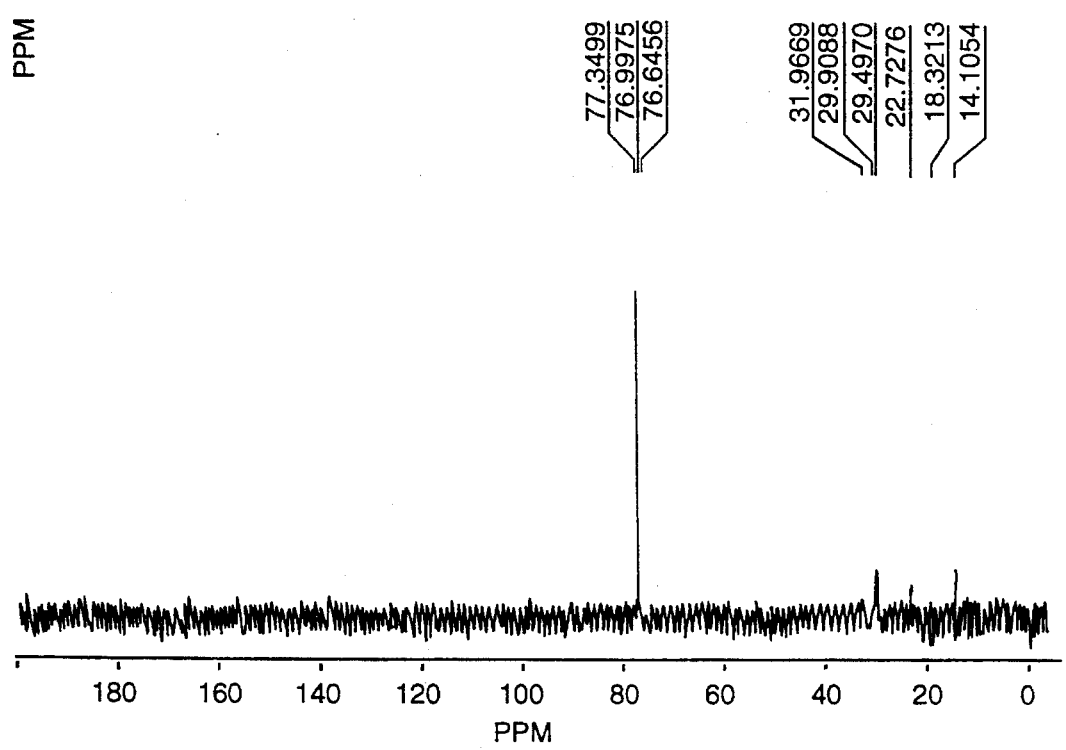
FIG. 17 is a carbon 13 ($^{13}$C NMR) of the poly(5,5'-(4,4'-dinonyl-2,2'-bithiazole)),also referred to as PNBT, of FIG. 7 with n greater than 20 and n about equal to 25. This higher polymer is as per FIG. 3B.

FIG. 17 is a carbon 13 NMR of the poly(5-5'-( 4,4'-dinonyl-2,2'-bithiazole)). Since there are a group of polymers of varying sizes in this sample, it is somewhat difficult to distinguish the individual features on a $^{13}$C NMR. Furthermore, the high viscosity of the polymer solution leads to broadening of the NMR signals. This broadening, taken together with the low concentration of the polymer, prevents one from obtaining a meaningful $^{13}$C NMR spectrum of PNBT.

FIG. 18 is a KBr IR of the monomer with the signals in the region of 2800 to 3200 CM$^{-1}$ indicating straight chain hydrocarbons. The signals in the region of 1600 and below were consistent with a 5 member ring with shifts due to the presence of nitrogen and sulphur.

FIG. 19 is a KBr IR of the dimer with signals similar to those described for FIG. 18, namely, the alkyl substituent groups being indicated in the region of 2800 to 3200 and the signals at or below 1600 being consistent with the presence of a ring structure.

FIG. 20 is a KBr IR of the polymer poly(5-5'-( 4,4'-dinonyl-2,2'-bithiazole)) (PNBT) with the signals between 2800 and 3200 indicating the R substituent. The signals at or below 1600 were consistent with the presence of aromatic ring structures.

FIG. 21 shows the graphic representation of the determination of intrinsic viscosity with a value of 4.75 dl/g obtained from the Y intercept for the poly(5-5'-(4,4'-dinonyl-2,2'-bithiazole)). The test was done in chloroform at 30° C.

FIG. 22 shows UV and fluorescence spectrum for the PNBT with the absorption being at approximately 429 nanometers and the emission being at approximately 510 nanometers. In contrast to FIG. 22, FIG. 23 showed that as the number of monomeric units increased from the monomer (n equals 1) to the dimer (n equals 2) to the polymer (n equals approximately 15 to 25), the lambda max of the conjugated polymer changed, progressing from 333 to 367 to 424. The lambda max of a conjugated polymer is indicative of the band gap between the highest occupied molecular orbital (HOMO) and the lowest unoccupied molecular orbital (LUMO) which, in turn, is related to the conductivity of the system. The graph of FIG. 23 shows the progression of lambda max from higher energies (shorter wavelengths) to lower energies (longer wavelengths) as one progresses from the monomer to the dimer and then to the polymer. As the conjugation length of the system increases, the band gap decreases, indicating the presence of conductivity characteristics desired.

A proton NMR and a carbon 13 NMR were obtained for the hexyl polymer and are consistent with the NMR data obtained for the nonyl-containing polymer. FIG. 24 shows a signal at 7 ppm indicating presence of the end group hydrogens and FIG. 25 shows signals in the region of 120 ppm to 165 ppm indicating the presence of ring carbons. The carbons of the hexyl group are shown in the region of 0 ppm to approximately 35 ppm.

Returning to the product of Example 1, the poly(5,5'-(4,4'-dinonyl-2,2'-bithiazole)) was further characterized by molecular weight, thermal analysis, combustion analysis, and powder WAXS (wide angle x-ray scattering). The powder WAXS indicated a semi-crystalline morphology as expected for a polymer with a regular structure. The thermal analysis indicated a melting point of approximately 304° C. as measured by differential scanning calorimeter (DSC) over the temperature range 40° C. to 350° C. at a rate of 10° C. per minute. The temperature of decomposition was determined to be 470° C. as measured by a 5% weight loss in the thermogravametric analysis. The combustion analysis revealed the following on a weight percent basis: 67.86 carbon, 9.09 hydrogen, 6.27 nitrogen, less than 0.2 bromine, and 0.42 nickel. The calculated weight percents, based on the monomeric unit for carbon, hydrogen, and nitrogen were respectively: 68.85, 9.15, and 6.69. The nonyl polymer demonstrated transmittance variability based on ability to change color. It also demonstrated conductivity. Conductivity experiments on the poly(5,5'-( 4,4'-dihexyl-2,2'-bithiazole indicated a conductivity of at least $3 \times 10^{-4}$ Scm$^{-1}$ (Siemens per centimeter) by a pressed pellet method. Methods for measuring conductivity are known, as described, for example, in U.S. Pat. Nos. 4,640,749; 4,758,634; and 4,818, 646. The polymer is thermochromic. As prepared, the solid is dark green. Dissolution of the green solid in CHCl$_3$ gives an essentially red solution that turns yellow in about 15 minutes. Thin films on glass plates, as cast by evaporating CHCl$_3$ or toluene solutions, are yellow (slow evaporation) or red (fast evaporation). Heating the yellow film to greater than 100° C. converts it to a red film. Melting the polymer by heating it about its melting point (304° C.), followed by cooling to room temperature, produces a green film. These changes are believed to result from different orientations of the rings along the polymer backbone caused by rotations around the C—C single bonds connecting the rings, and by different degrees of pi—pi ($\pi$—$\pi$) interchain stacking in the crystalline domains of the polymer.

Molecular weight determination was conducted via GPC (gel permeation chromatography) SEC (exclusion chromatography) for poly(5,5'-(4,4'-dihexyl-2,2'-bithiazole)) with n approximately equal to 9. It indicated a number average molecular weight $M_n$ of 3180 and a weight average molecular weight $M_w$ of approximately 4260. The method of determining $M_n$ and $M_w$ were in conformance with standard practice as defined in *"Polymer Science"* V. R. Gowariker, et al., Wiley Eastern Limited, 1986, New Delhi. The ratio of $M_w$ to $M_n$ equals PDI, which was approximately 1.34 (PDI=Polydispersity Index). Since the molecular weight determination was based on hexyl from one of the first polymerization attempts as described in Example 2, it is expected that these values will be considerably greater for the nonyl containing polymers prepared in accordance with Example 1 and having a number of repeat units, n, greater than 20.

The ability to form homopolymers of thiazole containing thiazole units directly linked one to another is surprising in view of failed attempts by others to produce such a homopolymer product. The method of the invention is surprisingly simple, straight-forward, and gives linear soluble polymer in contrast to the electrochemical methods now typically in use. Accordingly, the invention provides the very desirable, highly conjugated polymers having regular alternating single and double bonds adaptable for use in several possible applications. Such electroactive polymers which exhibit electrical, conductive, semi-conductive, electrochemical, electro-optical, or nonlinear optical properties, are useful for many applications such as electronics, electro-optic, battery, display, and semi-conductor applications.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

We claim:

1. A polymer comprising cyclic thiazole units having S (sulphur) at the 1 position, N (nitrogen) at the 3 position, a substituent R carried off of a carbon at the 4 position, and a carbon at each of the 2 and 5 positions; where at least three of said cyclic thiazole units are connected one to another by linkage between any combination of the carbons at the 2 and 5 positions; and where R is a hydrocarbon compound which does not contain an acidic proton.

2. The polymer according to claim 1 which is a conductive polymer having a conductivity of at least about $3 \times 10^{-4}$ $Scm^{-1}$ (Siemens per centimeter).

3. The polymer according to claim 1 wherein the R groups of each of the cyclic thiazole units are the same.

4. The polymer according to claim 1 which is a homopolymer with a plurality of cyclic thiazole units linked one to another in a pattern which comprises alternating 2—2 and 5—5 linkages.

5. The polymer according to claim 1 where R carries one or more substituents.

6. The polymer according to claim 1 having monomeric units of the formula:

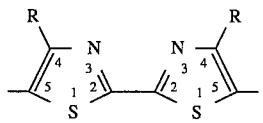

where R is selected from the group consisting of substituted and unsubstituted aliphatic compounds, substituted and unsubstituted aromatic compounds, substituted and unsubstituted heteroaromatic compounds, substituted and unsubstituted cyclic compounds, substituted and unsubstituted heterocyclic compounds, and combinations thereof.

7. The polymer according to claim 6 which is a conductive polymer having a conductivity of at least about $3 \times 10^{-4}$ Siemens per centimeter.

8. The polymer according to claim 6 where R is selected from the group consisting of substituted and unsubstituted alkyl compounds, substituted and unsubstituted aryl compounds, substituted and unsubstituted heteroaryl compounds, and combinations thereof.

9. The polymer according to claim 6 which is a homopolymer having a plurality of monomeric units containing the same R group and the R group is a nonyl group.

10. The polymer according to claim 9 which is a conductive polymer having a conductivity of at least about $3 \times 10^{-4}$ Siemens per centimeter.

11. The polymer according to claim 6 where each monomeric unit contains the same R group.

12. The polymer according to claim 6 where the R groups of the cyclic thiazole units are not all the same.

13. The polymer according to claim 6 wherein the cyclic thiazole units are in a regio-regular pattern.

14. The polymer according to claim 13 which is a poly(5,5'-(4,4'-dialkyl-2,2'-bithiazole)).

15. A polymer comprising cyclic thiazole units having S (sulphur) at the 1 position, N (nitrogen) at the 3 position, a substituent R carried off of a carbon at the 4 position, and a carbon at each of the 2 and 5 positions; where at least two of said cyclic thiazole units are connected one to another by linkage between any combination of the carbons at the 2 and 5 positions; and where R is a hydrocarbon compound having more than 1 carbon atom, and where R does not contain an acidic proton.

16. The polymer according to claim 15 which is a homopolymer.

17. The polymer according to claim 15 where R is selected from the group consisting of substituted and unsubstituted aliphatic compounds, substituted and unsubstituted aromatic compounds, substituted and unsubstituted heteroaromatic compounds, substituted and unsubstituted cyclic compounds, substituted and unsubstituted heterocyclic compounds, and combinations thereof.

18. The polymer according to claim 15 which is a conductive polymer having a conductivity of at least about $3 \times 10^{-4}$ Siemens per centimeter.

19. The polymer according to claim 15 where the R groups of each of the cyclic thiazole units are the same.

20. The polymer according to claim 15 where two or more of the R groups of the cyclic thiazole units differ from one another.

21. The polymer according to claim 15 where R carries one or more substituents.

22. The polymer according to claim 15 which comprises a pair of end cyclic thiazole units and intermediate cyclic thiazole units between the end units, where each of the intermediate units is connected through its 2 and 5 positions to respective adjacent intermediate thiazole units, and where each of the end units is connected through its 2 position to a respective adjacent intermediate thiazole unit and carries hydrogen or another terminal group at its 5 position.

23. A polymer of the general formula:

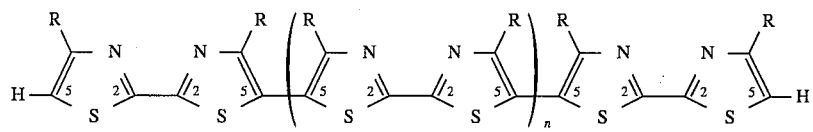

where R is a hydrocarbon having more than 1 carbon atom, and where R does not contain an acidic proton.

24. The polymer according to claim 23 where R has up to about 20 carbon atoms.

25. The polymer according to claim 23 where R is a nonyl group.

26. The polymer according to claim 23 where n is greater than 1 and up to about 5,000.

27. The polymer according to claim 23 where each of the R groups is the same and where R is selected from the group consisting of alkyl compounds, aryl compounds, alkyl substituted aryl compounds, heteroaryl compounds, alkyl substituted heteroaryl compounds, aryl substituted heteroaryl compounds, cyclic compounds, heterocyclic compounds, ether compounds, tertiary amine compounds, alkene compounds, and alkyne compounds.

28. The polymer according to claim 23 which has pi ($\pi$) conjugated alternating single and double bonds.

* * * * *

UNITED STATES PATENT AND TRADEMARK OFFICE
CERTIFICATE OF CORRECTION

PATENT NO. : 5,536,808          Page 1 of 2
DATED      : July 16, 1996
INVENTOR(S): M. David Curtis, John I. Nanos, and Mark D. McClain It is certified that error appears in the above-indentified patent and that said Letters Patent is hereby corrected as shown below:

Title page item [56],
under OTHER PUBLICATIONS in the second column, the first reference should read as follows:

T. Yamamoto, S. Wakabayashi, and K. Osakada, "Mechanism of C-C coupling reactions of aromatic halides, promoted by Ni(COD)$_2$ in the presence of 2,2'-bipyridine and PPh$_3$, to give biaryls", Journal of Organometallic Chemistry, 428, 223-237, 1992

In the Figures, on Sheet 2 of 16, Figure 5 should read as follows:

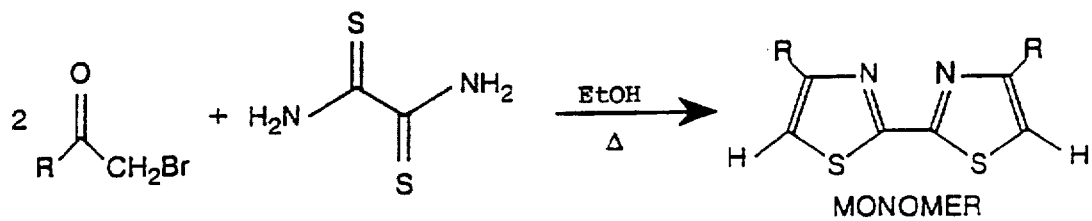

FIG.5

UNITED STATES PATENT AND TRADEMARK OFFICE
CERTIFICATE OF CORRECTION

PATENT NO.  : 5,536,808
DATED       : July 16, 1996
INVENTOR(S) : M. David Curtis, John I. Nanos, and Mark D. McClain It is certified that error appears in the above-indentified patent and that said Letters Patent is hereby corrected as shown below:

Title page item [56],
    under OTHER PUBLICATIONS in the second column, the fourth reference should read as follows:

T. Yamamoto, A. Morita, Y. Miyazaki, T. Maruyama, H. Wakayama, Z. Zhou, Y. Nakamura, T. Kanbara, S. Sasaki, and K. Kubota, "Preparation of $\pi$-Conjugated Poly-(thiophene-2,5-diyl), Poly(p-phenylene), and Related Polymers Using Zerovalent Nickel Complexes, Linear Structure and Properties of the $\pi$-Conjugated Polymers", American Chemical Society, Vol. 25, No. 4, 1214-1223, 1992.

Signed and Sealed this

Seventh Day of January, 1997

Attest:

BRUCE LEHMAN

*Attesting Officer*  *Commissioner of Patents and Trademarks*